(12) United States Patent
Buckingham et al.

(10) Patent No.: US 6,747,074 B1
(45) Date of Patent: Jun. 8, 2004

(54) INTUMESCENT FIRE SEALING COMPOSITION

(75) Inventors: Mark R. Buckingham, Cambridge (GB); Walton W. Welna, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/277,312

(22) Filed: Mar. 26, 1999

(51) Int. Cl.⁷ .............................................. C09K 21/14
(52) U.S. Cl. ...................... 523/179; 523/451; 523/468; 524/405; 524/406; 524/417
(58) Field of Search .................. 523/179, 451, 523/468, 466; 524/405–406, 417, 494–496, 80, 127; 428/921

(56) References Cited

U.S. PATENT DOCUMENTS

| | | | |
|---|---|---|---|
| 3,455,850 A | * 7/1969 | Saunders | 260/205 |
| 3,516,959 A | * 6/1970 | Jonas | 260/28 |
| 4,210,725 A | 7/1980 | Redfarn | |
| 4,269,944 A | 5/1981 | Redfarn | |
| 4,273,879 A | 6/1981 | Langer et al. | |
| 4,280,949 A | * 7/1981 | Kunstle et al. | 260/40 |
| 4,305,992 A | * 12/1981 | Langer et al. | 428/324 |
| 4,364,210 A | 12/1982 | Fleming et al. | |
| 4,443,517 A | 4/1984 | Shah | |
| 4,467,577 A | 8/1984 | Licht | |
| 4,521,333 A | 6/1985 | Graham et al. | |
| 4,588,523 A | 5/1986 | Tashlick et al. | |
| 4,599,369 A | * 7/1986 | Malcolm-Brown | 523/179 |
| 4,694,030 A | * 9/1987 | von Bonin et al. | 523/179 |
| 4,729,853 A | * 3/1988 | von Bonin | 523/179 |
| 4,810,741 A | 3/1989 | Kim | |
| 4,824,709 A | * 4/1989 | Tschirch | 428/921 |
| 4,879,066 A | 11/1989 | Crompton | |
| 4,945,015 A | 7/1990 | Milner et al. | |
| 4,952,615 A | 8/1990 | Welna | |
| 5,053,148 A | * 10/1991 | von Bonin | 252/202 |
| 5,059,637 A | 10/1991 | Langer | |
| 5,094,780 A | * 3/1992 | von Bonin | 252/609 |
| 5,173,515 A | * 12/1992 | von Bonin et al. | 521/103 |
| 5,175,197 A | 12/1992 | Gestner et al. | |
| 5,232,976 A | 8/1993 | Horacek et al. | |
| 5,382,387 A | * 1/1995 | von Bonin | 252/606 |
| 5,384,188 A | 1/1995 | Lebold et al. | |
| 5,476,891 A | 12/1995 | Welna | |
| 5,502,937 A | 4/1996 | Wilson | |
| 5,578,671 A | 11/1996 | Welna | |
| 5,810,914 A | * 9/1998 | Okisaki et al. | 524/495 |
| 5,830,319 A | * 11/1998 | Landin | 428/921 |
| 5,934,333 A | * 8/1999 | Munzenberger et al. | 138/109 |
| 6,010,763 A | * 1/2000 | Annemaier et al. | 428/921 |
| 6,031,040 A | * 2/2000 | Horacek | 524/495 |
| 6,124,394 A | * 9/2000 | Goto et al. | 524/495 |

FOREIGN PATENT DOCUMENTS

| | | |
|---|---|---|
| DE | 4 135 678 | 5/1993 |
| EP | 302 987 | 2/1989 |
| GB | 2070114 B | 9/1981 |
| GB | 2079669 B | 1/1982 |
| GB | 2114116 A | 8/1983 |
| GB | 2147301 A | 5/1985 |
| GB | 2147597 A | 5/1985 |
| GB | 2171136 B | 8/1986 |
| WO | WO 89/09808 | 10/1989 |
| WO | WO 96 20987 | 7/1996 |
| WO | WO 97 13823 | 4/1997 |
| WO | WO 98 30654 | 7/1998 |

OTHER PUBLICATIONS

Walter Michaeli "Plastics Processing"–85–100, 1995.*
Berg, J., "Positive Pressure", *The Construction Specifier*, pp. 126–134 (Sep. 1993).
Brochure entitled "3M Fire Protection Products—A Complete Line of Firestop Systems", *3M Innovation*, 12 pgs. (1997).

* cited by examiner

*Primary Examiner*—Peter Szekely
(74) *Attorney, Agent, or Firm*—David B. Patchett

(57) ABSTRACT

Described is a flexible, solid fire sealant produced by high shear mixing in a substantially volatile-free state and capable of being molded or extruded into a variety of shapes and used as firestops for windows, doors, dampers, shutters, and through-penetrations, the sealant containing water-insoluble intumescent mineral granules, a polymeric, halogen-free binder, and a flame retardant, wherein the sealant has a softness value from about 0.01 to about 3.75 mm and exhibits high expansion values and chars upon exposure to heat.

1 Claim, No Drawings

INTUMESCENT FIRE SEALING COMPOSITION

FIELD OF THE INVENTION

This invention relates to a flexible, solid intumescent composition which acts as a seal in deterring the spread of fire, smoke, and fumes, and is especially adaptable as fire resistant glazing strips for metal and wood window frames, doors, dampers and shutters, and may also provide sealing where items such as plastic pipes and electrical cables pass through openings.

BACKGROUND OF THE INVENTION

Fire, smoke, and fumes in confined spaces, such as multi-floor buildings, can be extremely life threatening. Frequently, if fire originates in the space between a floor and ceiling of such a structure, the fire, and resultant smoke and fumes, will tend to spread to other open spaces in the building, especially to open spaces above the point of origin of the fire.

The openings in floors, walls, and ceilings and the conduits, piping, cables, and the like that pass through are known as "through-penetrations". If not protected by fire resistant materials, a through-penetration offers an area of low resistance to fire, smoke, and fumes, and in essence may serve as a chimney for heat, flame, smoke, and fumes. The spaces between these conduits, piping, etc. may be filled and blocked with commercially available fire retardant and intumescent putties, caulks, wraps, sheets or mats, known in the art as "firestops."

Representative firestop products are disclosed in product brochure number 98-0400-4875-7 (published 1997) from Minnesota Mining and Manufacturing Company (3M). The 3M products are currently known under the trade designations "3M Brand Fire Barrier CP-25WB$^+$" and "Interam™ Firedam 150" (caulks); "3M Brand Fire Barrier MPP-1$^+$, MPP-4S$^+$, MPP-5S$^+$, and "MPS-2$^{+}$" (moldable putties); "FS-195$^+$ A/P Strip" (wrap/strip), "FS-195$^+$ AP$^+$, AA$^+$ and RR$^{+}$" (sheets); and CS-195$^+$ (metal reinforced sheet). These products are described in U.S. Pat. Nos. 5,175,197; 5,059,637; 5,476,891; and 5,578,671. Other intumescent materials have been used, such as those known under the trade designations "Palusol" (commercially available from BASF) and "Expantrol™" (commercially available from 3M), the latter being a hydrated alkali metal silicate.

Intumescent sealing strips or other profiles are often required to prevent the spread of fire in buildings and other enclosed spaces. Intumescent materials expand when heated to fill up any spaces left by combustible materials which are consumed by the fire. In the case of glazing seals, these profiles also help to keep glass panels in place during a fire.

Such materials should also form a strong char when heated. The char formed should be resistant to erosion by exposure to the heat and pressures encountered during a fire. It is advantageous to minimize the amounts of smoke and toxic gases generated by such sealants during a fire.

These sealant materials should have good aging properties and resistance to environmental agents normally encountered. Ideally they should last at least as long as the building in which they are installed.

There continues to exist a need in the art for improved fire sealing compositions that are flexible, can be extruded into a variety of shapes, and have the capability of expanding many times their original volume when exposed to heat.

SUMMARY OF THE INVENTION

The present invention provides for the preparation, at a moderate cost, of a fire sealing composition which is flexible, solid and capable of being applied in various shapes including sheets, extruded strips or other profiles. The composition exhibits an excellent combination of fire resistance, flexibility, char strength, and water resistance.

It has been discovered that compounding ingredients under high shear conditions in a substantially volatile-free condition results in fire barrier materials with improved tensile properties, improved Shore and penetrometer hardness values, and higher volumetric expansions upon exposure to fire or extreme heat when compared to formulations which were prepared with a volatile solvent or carrier present. For example, fire barrier materials obtained by high shear compounding with polymer from a dried latex demonstrated significantly improved properties over control formulations with the same ingredients which were thoroughly mixed in the wet state and then allowed to dry without high shear mixing in the dry state. It is difficult to obtain sufficiently high shear during compounding when a volatile solvent or carrier is present. Mixing of ingredients which would result in a composition having a value in a penetration test, as described below, greater than about 4 mm may not introduce sufficiently high shear even in a substantially volatile-free state. The required high shear mixing conditions are typically met when a resulting fire barrier material has a penetration test value less than about 4 mm and when thorough mixing of the fire barrier material ingredients is performed in a state which is substantially free of volatiles.

Accordingly, the present invention includes a flexible, solid fire sealing composition comprising: (a) water-insoluble intumescent mineral granules; (b) a thermoplastic or thermosetting, halogen-free binder; and (c) a phosphorus containing flame retardant, wherein said composition has a softness value from about 0.01 to about 3.75 mm.

A second aspect of the present invention is a process for preparing a flexible, solid fire sealing composition including the step of high shear mixing in a substantially volatile-free state: (a) water-insoluble intumescent mineral granules, (b) a halogen-free organic binder, and (c) a phosphorus containing flame retardant, wherein the resulting composition has a softness value (penetrometer) of from about 0.01 to about 3.75 mm.

The intumescent material is made of water-insoluble mineral granules, such as for example hydrated alkali metal silicates, preferably such silicates incorporating an oxy boron compound, e.g. 3M Expantrol™ 4BW.

The organic binder is a thermoplastic or thermosetting, halogen-free polymeric material. The thermoplastic or thermoset organic polymers used as the binders also provide the flexibility required, good char strength and a high level of intumescence in combination with the intumescent granules.

The use of halogen-free binder materials eliminates the risk of formation of toxic and corrosive halogen acid gases during a fire. The use of halogen-free binder materials requires the addition of a flame retardant to the composition of the present invention.

The fire sealing compositions of the present invention are an advance over the art because of their improved tensile strength, Shore hardness and lower penetrometer value. When subjected to heat, they also exhibit higher volume expansion values that are beneficial in sealing penetrations during a fire. Another distinguishing feature of the present invention is the fact that the compositions are not only flexible but solid, i.e. substantially free of volatiles, e.g. water or organic solvents. A small quantity of liquid plasticizer may optionally be incorporated, but the overall composition is solid at room temperature and does not exhibit the flow properties of a water- or solvent-borne dispersion of a caulk, mastic, paint or coating material.

The compositions of the present invention are also distinguishable from putty-like materials which are soft and malleable at room temperature. As noted above, the compositions of the present invention, although flexible, have a well-defined shape to which they will tend to revert following small deformation.

Other aspects of the present invention are methods of fire stopping a through-penetration, door or window, the methods including the steps of applying the composition of the invention above described to a through-penetration, door or window and allowing the composition to expand and char upon exposure to heat.

DETAILED DESCRIPTION

The process of the present invention requires high shear mixing of the components in a volatile-free state. The resulting fire sealing compositions are flexible and intumescent (expand when heated). Preferably the seals are thermoplastic or elastomeric and may be prepared using standard molding or extrusion techniques for high shear mixing and shaping thermoplastic polymers or elastomeric rubber-like materials. The compositions or materials may either be cured (thermosetting) or uncured (thermoplastic). In general, uncured materials give rise to higher expansion levels, whereas cured materials have improved elastic properties and may also have higher char strength.

The compositions of the present invention incorporate at least three ingredients, namely an intumescent material, a halogen-free organic binder, and a flame retardant.

The intumescent materials are water-insoluble mineral granules. Intumescent material may be a granular hydrated alkali metal silicate such as described in U.S. Pat. No. 4,273,879 (Langer et al.), incorporated herein by reference. The preferred alkali metal silicates described in the '879 patent are granulated sodium silicates having a moisture content of about 5 to about 30 weight percent, a silicon dioxide ($SiO_2$) to sodium oxide ($Na_2O$) ratio ranging from about 2.0:1 to about 3.75:1, and particle sizes ranging from about 0.2 mm to 2.0 mm (i.e. about 95% of the particles being greater than 0.2 mm).

A preferred water-insoluble mineral granule is a mixture of alkali metal silicate represented by the formula $M_2O:xSiO_2$ in which M is an alkali metal. The mixture also includes at least one oxy boron compound which may be selected from boric acid and borate salts of Group I and II elements and water. The weight ratio X ranges from about 1.5 to about 4, the molar ratio of boron to M is between about 0.2 and about 0.9, and the water comprises about 5 to 15 weight percent of the total composition.

There are many silicates which could be used. Examples cited in Graham et al., U.S. Pat. No. 4,521,333 include sodium silicate, lithium silicate and potassium silicate.

There are many oxy boron compounds which could be used for the present invention. Examples cited in Graham et al. '333 of oxy boron compounds include metaborate, tetraborate, perborate, polyborate radicals, boric acid, colemanite, calcium metaborate, magnesium borate and zinc borate.

Other intumescent compounds may be used especially if admixed with the above silicates. These intumescent compounds include, for example, expandable graphite, vermiculite, perlite, NaBSi, glass particles, mica, inorganic and organic blowing agents and mixtures thereof. Preferred intumescent graphite materials include: Kropfmuehl A15/90 commercially available from Graphitwerk Kropfmuehl A G, Hauzenberg, Germany; Sigraflex FR 90-60/80 Type 2, commercially available from Normann Rassmann GMBH & Co., Hamburg, Germany; and Expan-C-8099 LTE commercially available from Lineta, Kobenhavn, Denmark. Such graphite may be admixed with the granulated hydrated alkali metal silicate intumescent composition mentioned above under the trade designation "Expantrol™ 4BW" from 3M Company of St. Paul, Minn. The amount of intumescent material typically may range from about 10 to about 70 wt-%, preferably from about 25 to about 60 wt- %, based on a total weight of fire sealing composition.

The second component is a halogen-free organic binder. This material is a thermoplastic or thermosetting binder.

"Thermoplastic" materials typically have long polymer chains with few, if any, chemical bonds acting to crosslink the chains. Thermoplastic materials, when heated, normally become soft and moldable to a desired shape. Subsequent reheating serves to resoften the material. Examples of thermoplastic materials include substantially linear polymers such as acrylate polymers, ethylene vinyl acetate copolymers, natural rubbers, styrene butadiene copolymers, butadiene acrylonitrile copolymers, polyisoprene, polybutadiene, polyvinyl acetate, polyethylene terephthalate, polyethylene, polypropylene, polystyrene, and combinations and mixtures of these polymers. The term "substantially linear" as used with reference to these materials refers to a preference for no more than three or four branches on average per polymer chain, preferably one or two, and most preferably zero.

"Thermoset" materials refer to polymers which undergo crosslinking reactions and thus cure or "set", typically upon heating. If the crosslinking density is sufficiently high, the material tends to be hard, infusible, and insoluble. The shape of such materials typically cannot be subsequently permanently changed if warmed. Two or more liquid components can be reacted to form a thermoset polymer; for example, a multifunctional amine and a multifunctional epoxy may be reacted to form an epoxy system. Examples of suitable thermoset materials include epoxies, phenolics, polyesters, silicones, polyurethanes, polyimides and the like. In addition, suitable thermoset materials include thermoplastic materials capable of being crosslinked with the addition of a crosslinking agent and/or exposure to an appropriate energy source such as an electron beam. The materials include, for example, natural rubber, styrene butadiene copolymers, butadiene acrylonitrile copolymers, and polybutadiene.

If the binder is in the form of a latex, the latex material must be dried prior to the high shear mixing to remove water and other volatiles, if present.

Preferred thermoplastic or thermosetting binders include synthetic or natural isoprene rubber, ethylene propylene rubber, EPDM rubber, and polybutadiene. The most preferred binder contains an ethylene vinyl acetate copolymer. Blends of these materials, e.g., ethylene vinyl acetate/synthetic isoprene rubber may also be employed.

The amount of binder may typically range from about 10 to about 50 wt- %, preferably from about 12 to about 40 wt-%, based on the total weight of the fire barrier material.

A third ingredient in the fire sealing composition is a flame retardant. This flame retardant is preferably a phosphorous and/or nitrogen containing material which promotes the charring of organic binders by forming an acid when heated. Preferred phosphorous containing compounds include compounds containing ammonium polyphosphate (APP). Thus, examples of such phosphorus containing products include Exolit IFR-10, Spinflam MF82/PP (both of which contain APP), and Amgard EDAP (ethylenediamine phosphate) and NH1197 (believed to be a phosphate salt of pentaerythritol). Endothermic materials are also appropriate flame retardants. A preferred endothermic material is, for example, alumina trihydrate.

Typically flame retardant compounds, when present, are in an amount ranging from about 10 to about 50 wt- %, preferably about 15 to about 40 wt- %, based on the total weight of the fire sealing composition.

Further optional ingredients may also be present to add or enhance the properties of the fire sealing composition and may include fillers, pigments, and processing aids. In addition, since thermosetting materials may be employed as a binder, curative or crosslinking agents may be present such as, for example, organic peroxides such as dicumyl peroxide.

Plasticizers, preferably a flame retardant plasticizer, most preferably an organic phosphate plasticizer, e.g. SANTI-CIZER 141 or 148 from Monsanto, may also be used. The amount of plasticizer should be limited to avoid the composition becoming too soft or putty-like. A plasticizer may be used as a process aid in extruding or molding the sealant in its desired shape.

Antioxidants and anti-ozonants may also be used, e.g. hindered phenolics, aromatic amines and others, such as for example, Irganox 1010. Colorants such as organics, e.g. pigments, lakes or dyes, or inorganic pigments, e.g. titanium oxide, zinc oxide or iron oxides, may also be added as desired.

The process of the present invention is carried out by combining the ingredients used through a high shear mixing operation where such mixing is carried out in a volatile-free state. Typically, the composition is made by high shear mixing of the various ingredients using for example, a 2-roll mill, Banbury mixer, or, preferably, a twin-screw extruder equipped with heating/cooling capabilities to control the processing temperature.

The term "a substantially volatile-free state" means that the high shear mixing takes place in a chamber where the components of the composition are free of volatile organic solvents and the binder is also essentially free of water (i.e., containing less than 0.25% by weight). This water being other than bound water, wherein bound water is water that does not evaporate until the material is heated to at least 100° C. (preferably, at least 150° C., more preferably at least 250° C.).

The binder is either pre-dried, e.g. in an oven, or, if dry, directly added to the mixing chamber and mixed until thoroughly blended. Any fillers, processing aids, char forming resins, waxes, colorants, flame retardants, antioxidants, antiozonants, curatives, and plasticizers are then added while the mixing operation continues. The last ingredient added is usually the intumescent material. The composition is typically mixed until homogeneous and smooth (i.e., not lumpy).

The composition can also be prepared by adding the ingredients to a heated zone of a twin screw extruder where volatiles, if present, are removed prior to entering a mixing zone. Following mixing, the composition is extruded into various shapes and sizes, e.g., profiles, sheets, and strips. The shape and size are dictated by the application.

The compositions of the present invention have utility as fire resistant glazing strips/profiles and as fire and smoke seals for fire rated doors, dampers, shutters, and penetration seals.

The following examples are provided to further illustrate the present invention and are not intended to be limiting thereon. The ingredients used for the examples are listed in Table 1, below.

EXAMPLES

TABLE 1

Source of Ingredients Used in the Examples

| Ingredient | Trade Designation | Source of Ingredient |
|---|---|---|
| Natural rubber latex | Kagetex FA2005 Latex | The Ore Chemical Corp., Virginia Beach, VA |
| Vinyl acetate-ethylene emulsion | Airflex 405 Emulsion | Air Products and Chemicals, Inc., Allentown, PA |
| Vinyl acetate-ethylene-acrylate emulsion | Flexbond 153 Emulsion | Air Products and Chemicals, Inc., Allentown, PA |
| Ethylene-vinyl acetate | Elvax 240 | Dupont Co., Wilmington, DE |
| Natural rubber | Natural Rubber SMR-CV60 | Cargill, New York, NY |
| Tetrakis[methylene(3,5-di-tert-butyl-4-hydroxy-hydrocinnamate)] methane | Irganox 1010 | Ciba-Geigy Corp., Hawthorne, NY |
| Calcium stearate | Synpro 24-46 | Synthetic Products Co., Cleveland, OH |
| Titanium dioxide | Tipure R-706 | Dupont Co., Wilmington, DE |
| Titanium dioxide | Titan RKB4 | Kerr McGee, West Chicago, IL |
| Ammonium polyphosphate | Hostaflam AP422 | Hoechst Celanese Corp., Somerville, NJ |
| Ammonium polyphosphate | Phos-Chek P-30 | Monsanto Chemical Co., St. Louis, MO |
| 2-Ethylhexyl diphenyl phosphate | Santicizer 141 | Monsanto Chemical Co., St. Louis, MO |
| Octylphenoxy-polyethoxyethanol | Triton X405 | Union Carbide, Danbury, CT |
| Sodium salt of polymeric carboxylic acid | Tamol 850 | Rohm and Haas, Philadelphia, PA |
| Proprietary | Foamaster 111 | Henkel Corp., Minneapolis, MN |
| Expandable graphite | Kropfmuehl A15/90 | Graphitwerk Korpfmuehl Ag, Hauzenberg, Germany |
| Expandable graphite | Sigraflex FR 90-60/80 Type 2 | Normann Rassmann Gmbh & Co., Hamburg, Germany |
| Expandable graphite | Expan-C-8099 Lte | Lineta, Kobenhavn, Denmark |
| Hydrated sodium silicate granules | Expantrol ™4BW | 3M Co., St. Paul, MN |

Test Methods

Penetrometer Method

The softness value was determined using a penetrometer (available as Model 73510 from Precision Instruments of Chicago, Ill.). The measurement involves dropping a weighted cone-shaped object onto the material, and then measuring the distance the object penetrates. The dimensions of the cone and shaft are described in A1.1 of ASTM D 1403-91. An additional weight of 150 grams was placed on the 9.38 gram shaft and cone described in A1.1.

The measurement was made by stacking three ⅛" (0.318 cm) (nominal) layers of sample and taping the ends and sides to a metal plate. The mechanisms that hold the cone are set to the zero position and the apparatus is adjusted so that the tip of the cone lightly touches the surface of the sample. The cone is released rapidly and allowed to drop for 5 seconds. The indicator shaft is depressed and the penetration read from the dial. Greater penetration (higher values) is indicative of softer materials.

Expansion Ratio

Procedure 1

For Examples 1 through 4, the expansion ratio (volume of the charred sample divided by the initial volume) of each sample was determined as follows: A portion of the compounded materials was pressed to a thickness of ⅛ in (0.318 cm). Next, a 1 in (2.54 cm) diameter disk was die cut from each pressed sheet.

The initial volume of each disk was determined by coating the disk by dipping it in molten paraffin wax, weighing the disc, and weighing the disc submerged in de-ionized water, and then calculating the volume using the following equation:

$$\text{Volume} = \frac{\text{Weight in Air} - \text{Submerged Weight}}{\text{Density of Water}} \quad \text{Equation 1}$$

The disc was then placed in a muffle furnace at 350° C. for 15 minutes to intumesce and char. The resulting charred, expanded disc was coated with wax and weighed, and then submerged and weighed in de-ionized water. The volume of the charred, expanded disc was calculated using Equation 1 (above).

The expansion ratio was calculated using Equation 2, below.

$$\text{Expansion Ratio} = \frac{\text{Volume of Charred, Expanded Disc}}{\text{Volume of Uncharred Disc}} \quad \text{Equation 2}$$

Procedure 2

For Examples 5 and 6, the expansion ratio of each sample was determined as follows: The initial volume of the sample was calculated from the dimensions of the sample. All samples were 0.98 in×0.98 in×0.12 in (2.5 cm×2.5 cm×0.3 cm).

The sample was heated in an oven at 350° C. for 10 minutes to intumesce and char. The resulting charred, expanded disc was coated with wax. The volume of the charred, expanded disc was obtained from the weight of water displaced when the wax sealed sample was pushed beneath the surface of water in a beaker placed on a balance. The expansion ratio was calculated using Equation 2 above.

Tensile and Elongation

Tensile and elongation properties were tested in accordance with ASTM D-412, Method A, "Rubber Properties in Tension."

Shore Hardness

The hardness was tested with a Shore Durometer available from Shore Instrument & Manufacturing Co., Jamaica, N.Y., in the following manner. The sample was placed on a hard horizontal surface. The pressor foot of the durometer was applied as rapidly as possible with firm contact to sample at least one-quarter inch from the edge. The scale was read within one second after the pressor foot was in firm contact with the sample. The maximum reading on the scale was recorded.

Example 1

Formulation from Pre-Dried Kagetex FA2005 Latex (Natural Rubber Latex)

Trays of known weights of Kagetex FA2005 latex were placed in ovens at 60° C. and dried to constant weight. Subsequently, to obtain homogeneity, the dried latices were milled together on a 16 in, two-roll rubber mill (available from Reliable Rubber & Plastic Machinery Co., North Bergen, N.J.). The average percent solids of the latex was calculated as 61.5% from weight loss of the dried latices.

The composition (shown in Table 2) was compounded in an internal mixer equipped with cam mixing blades. (Prep Mixer, Part #02-22-000, 350/420 cubic cm capacity; available from C. W. Brabender Instruments, Inc. of South Hackensack, N.J.) The mixer was powered by a Plasticorder, Model DRK-2071, electronic torque rheometer with a Model FE-2000 interface (each of which are available from C. W. Brabender Instruments, Inc.). It is referred to as the "Brabender" mixer.

TABLE 2

| Ingredient | Parts by Weight | Percent |
| --- | --- | --- |
| Kagetex FA2005 (dried to constant weight) | 100 | 27.1 |
| Irganox 1010 | 1.00 | 0.271 |
| Synpro 24-46 | 0.500 | 0.135 |
| Ti-Pure R-706 | 10.0 | 2.71 |
| Hostaflam AP422 | 79.0 | 21.4 |
| Santicizer 141 | 4.00 | 1.08 |
| Expantrol ™ 4BW | 175 | 47.4 |

The dried Kagetex was added to the mixer and mixed at 60 rpm for 5 minutes. The speed was reduced to 40 rpm. During mixing, Irganox 1010, Synpro 24–46, Ti-Pure R-706, Hostaflam AP422, and Santicizer 141 were added consecutively within the next fourteen minutes. Expantrol™ 4BW was added; the speed increased to 60 rpm and mixing continued for 6 minutes. Total mixing time was 25 minutes.

The composition was removed and placed between release liners, ⅛ in (0.318 cm) shims, and pressed into a sheet at 60° C. in a Wabash press, Model 7S-1818-2TM.

Example 2 (Comparative)

Formulation from Kagetex FA2000 Latex (Natural Rubber Latex)

The composition (shown in Table 3) was compounded in a 1 gallon Hobart N-50 mixer. The mixer is available from Hobart Corporation, Troy, Ohio.

TABLE 3

| Ingredient | Parts by Weight on a Wet Basis | Parts by Weight on Solids Content | Percent Based on Solids Content |
| --- | --- | --- | --- |
| Kagetex FA2005 Latex | 162.6 (61.5% solids)* | 100 | 27.1 |
| Irganox 1010 | 1.00 | 1.00 | 0.271 |
| Synpro 24-46 | 0.500 | 0.500 | 0.135 |
| Ti-Pure R-706 | 10.0 | 10.0 | 2.71 |
| Hostaflam AP422 | 79.0 | 79.0 | 21.4 |
| Santicizer 141 | 4.00 | 4.00 | 1.08 |
| Expantrol ™ 4BW | 175 | 175 | 47.4 |

*The percent solids was obtained by drying to constant weight.

The Hobart speed was set at 1 throughout the entire mixing procedure.

Kagetex FA2005 and Irganox 1010 were added and mixed for 1 minute. Within a mixing time of 9 minutes and mixing occurring between additions, Synpro 24–46, Ti-Pure R-706, Hostaflarn AP422, and Santicizer 141 were consecutively added. In similar manner, Expantrol™ 4BW was added in halves with a mixing time of 4 minutes. Mixing blades and bowl were scraped and ingredients mixed another 4 minutes for a total mixing time of 18 minutes. A portion of the composition was placed between release liners, ⅛ in (0.318 cm) shims, and pressed into a sheet at 60° C. in a Wabash press, Model 7S-1818-2TM. After 24 hours, the press was opened, top liner removed, press left opened slightly, and the composition was dried to constant weight.

Example 3

Formulation From Pre-Dried Airflex 405 Emulsion (Vinyl Acetate-Ethylene Emulsion)

Trays of known weights of Airflex 405 emulsion were placed in ovens at 60° C. and dried to constant weight Subsequently, to obtain homogeneity, the dried latices were milled together on a 16 in, two-roll rubber mill (available from Reliable Rubber & Plastic Machinery Co., North Bergen, N.J.). The average percent solids of the emulsion was calculated as 55.5% from weight loss of the dried latices.

The composition (shown in Table 4) was compounded in an internal mixer equipped with cam mixing blades. (Prep Mixer, Part #02-22-000, 350/420 cubic cm capacity; available from C. W. Brabender Instruments, Inc., of South Hackensack, N.J.) The mixer was powered by a Plasticorder, Model DRK-2071, electronic torque rheometer with a Model FE-2000 interface (each of which are available from C. W. Brabender Instruments, Inc.). It is referred to as the "Brabender" mixer.

TABLE 4

| Ingredient | Parts by Weight | Percent |
| --- | --- | --- |
| Airflex 405 (dried to constant weight) | 100 | 27.1 |
| Irganox 1010 | 1.00 | 0.271 |
| Synpro 24-46 | 0.500 | 0.135 |
| Ti-Pure R-706 | 10.0 | 2.71 |
| Hostaflam AP422 | 79.0 | 21.4 |
| Santicizer 141 | 4.00 | 1.08 |
| Expantrol ™ 4BW | 175 | 47.4 |

Initially, the toughness of the pre-dried Airflex polymer caused excessive torque in the Brabender which resulted in rupture of the shear pin. An alternate method of addition to that described for Example 1 was used to prevent shear pin rupture and is described below.

The Brabender mixer was heated to 150° C. A 40 rpm mixing speed was used throughout the entire mixing procedure. Irganox, 1010, Synpro 24–46, Ti-Pure R-706, and Hostaflam AP422 were added to the mixer and mixed for 1 minute, Airflex 405 was added slowly during 5 minutes until uniform. One-fourth of the Expantrol™ 4BW, Santicizer 141, and remaining Expantrol™ 4BW were consecutively slowly added. Total mixing time was 12 minutes. The composition was immediately removed and placed between release liners, ⅛ in (0.318 cm) shims, and pressed into a sheet at 150° C. in a Wabash press, Model 7S-1818-2TM.

Example 4 (Comparative)

Formulation From Airflex 405 Emulsion (Vinyl Acetate-Ethylene Emulsion)

The composition (shown in Table 5) was compounded in a 1 gallon Hobart N-50 mixer. The mixer is available from Hobart Corporation, Troy, Ohio.

TABLE 5

| Ingredient | Parts by Weight on a Wet Basis | Parts by Weight on Solids Content | Percent Based on Solids Content |
| --- | --- | --- | --- |
| Airflex 405 Emulsion | 180.2 (55.5% solids)* | 100 | 26.4 |
| Irganox 1010 | 1.00 | 1.00 | 0.264 |
| Synpro 24-46 | 0.500 | 0.500 | 0.132 |
| Ti-Pure R-706 | 10.0 | 10.0 | 2.64 |
| Hostaflam AP422 | 79.0 | 79.0 | 20.8 |
| Santicizer 141 | 4.00 | 4.00 | 1.06 |
| Expantrol ™ 4BW | 175 | 175 | 46.2 |
| Triton X405 | 4.00 | 2.80 | 0.739 |
| Tamol 850 | 4.00 | 1.20 | 0.317 |
| Foamaster 111 | 5.40 | 5.40 | 1.43 |

*The percent solids was obtained by drying to constant weight.

To obtain a satisfactory sample, it was necessary to add two surfactants, Triton X405 and Tamol 850, and a defoamer, Foamaster 111, to the composition. The Hobart speed was set at 1 throughout the entire mixing procedure. Airflex 405, Triton X405, Tamol 850, Irganox 1010, and ⅓ of Foamaster 111 were added and mixed for 1 minute. Within 6 minutes and mixing occurring between additions, Synpro 24–46, Ti-Pure R-706, and Santicizer 141 were consecutively added. Expantrol™ 4BW was added in halves with a mixing time of 4 minutes. One-third of Foamaster 111 was added and mixed for 1 minute. Hostaflam AP422 was added and mixed for 2 minutes. Mixing blades and bowl were scraped, the final ⅓ of Foamaster 111 added, and sample mixed for 30 seconds. The scraping was repeated and composition mixed for 30 seconds. Total mixing time was 15 minutes. A portion of the composition was placed between release liners, ⅛ in (0.318 cm) shims, and pressed into a sheet at 60° C. in a Wabash press, Model 7S-1818-2TM. After 24 hours, the top liner was removed and the composition was placed in an oven at 70° C. and dried to constant weight.

In Table 6, test results in accordance with ASTM D-412, Method A, "Rubber Properties in Tension," and Shore A hardness are given for compositions described in Examples 1–4. The procedure for measuring Shore A hardness is given under "Test Methods." Penetrometer and expansion ratio test results are shown in Tables 7 and 8 for Examples 1–4. These tests are described under "Test Methods."

TABLE 6

Tensile and Hardness Properties[1] of Compositions Described in Examples 1–4

| Example Number | Emulsion | Polymer | Batch Number | Ultimate Strength/ STDEV[2] | Ultimate Elongation/ STDEV[2] | Shore A Hardness/ STDEV[2] | Average Ultimate Strength/ STDEV[3] | Average Ultimate Elongation/ STDEV[3] | Average Shore A Hardness/ STDEV[3] |
| --- | --- | --- | --- | --- | --- | --- | --- | --- | --- |
| 1 | Kagatex FA2005 pre- | Natural rubber | 1 | 115/2.83 | 427/19.3 | 69/2.6 | 120/5.18 | 450/35.0 | 70/2.3 |
| | | | 2 | 125/3.16 | 450/35.0 | 72/2.3 | | | |

TABLE 6-continued

Tensile and Hardness Properties[1] of Compositions Described in Examples 1–4

| Example Number | Emulsion | Polymer | Batch Number | Ultimate Strength/ STDEV[2] | Ultimate Elongation/ STDEV[2] | Shore A Hardness/ STDEV[2] | Average Ultimate Strength/ STDEV[3] | Average Ultimate Elongation/ STDEV[3] | Average Shore A Hardness/ STDEV[3] |
|---|---|---|---|---|---|---|---|---|---|
|  | dried emulsion |  | 3 | 120/3.65 | 472/38.0 | 69/1.4 |  |  |  |
| 2 | Kagatex FA2005 emulsion | Natural rubber | 1 | 71/7.1 | 333/59.5 | 35/7.1 | 64/11 | 305/65.4 | 35/4.3 |
|  |  |  | 2 | 51/4.8 | 251/68.3 | 37/3.2 |  |  |  |
|  |  |  | 3 | 68/6.4 | 331/36.2 | 34/0.89 |  |  |  |
| 3 | Airflex 405 pre-dried emulsion | Vinyl acetate-ethylene | 1 | 278/34.2 | 220/41.8 | 88/2.7 | 275/26.5 | 211/53.4 | 90/2.5 |
|  |  |  | 2 | 268/13.2 | 226/65.2 | 91/2.5 |  |  |  |
|  |  |  | 3 | 280/31.5 | 188/54.4 | 91/1.4 |  |  |  |
| 4 | Airflex 405 emulsion | Vinyl acetate-ethylene | 1 | 128/13.1 | 47/16 | 84/1.4 | 117/22.3 | 62/28 | 81/3.8 |
|  |  |  | 2 | 90/6.8 | 87/30 | 77/2.2 |  |  |  |
|  |  |  | 3 | 132/12.6 | 52/19 | 82/2.8 |  |  |  |

[1]Tensile properties tested in accordance with ASTM D-412, Method A. Shore A hardness tested as described under Test Methods.
[2]Numbers represent an average of 5 measurements.
[3]Numbers represent an average of 15 measurements (5 on each batch).

TABLE 7

Penetrometer Measurements of Compositions Described in Examples 1–4

| Example Number | Emulsion | Polymer | Batch Number | Penetrometer Measurement (mm)/ STDEV[1] | Average Penetrometer Measurement (mm)/ STDEV[2] |
|---|---|---|---|---|---|
| 1 | Kagatex FA2005 pre-dried emulsion | Natural rubber | 1 | 1.40/0.086 | 1.42/0.074 |
|  |  |  | 2 | 1.41/0.074 |  |
|  |  |  | 3 | 1.45/0.055 |  |
| 2 | Kagatex FA2005 emulsion | Natural rubber | 1 | 2.12/0.339 | 2.01/0.449 |
|  |  |  | 2 | 1.95/0.453 |  |
|  |  |  | 3 | 1.96/0.554 |  |
| 3 | Airflex 405 pre-dried emulsion | Vinyl acetate-ethylene | 1 | 0.64/0.07 | 0.57/0.13 |
|  |  |  | 2 | 0.59/0.16 |  |
|  |  |  | 3 | 0.49/0.08 |  |
| 4 | Airflex 405 emulsion | Vinyl acetate-ethylene | 1 | 0.60/0.17 | 0.65/0.15 |
|  |  |  | 2 | 0.69/0.15 |  |
|  |  |  | 3 | 0.67/0.12 |  |

[1]Numbers represent an average of 10 measurements. High values indicate softer material.
[2]Numbers represent an average of 30 measurements. Penetrometer values were determined as described under Test Methods, Penetrometer Method.

TABLE 8

Expansion Ratio Measurements of Compositions Described in Examples 1–4

| Example Number | Emulsion | Polymer | Expansion Ratio/STDEV[1] |
|---|---|---|---|
| 1 | Kagatex FA2005 pre-dried emulsion | Natural rubber | 8.8/0.15 |
| 2 | Kagatex FA2005 emulsion | Natural rubber | 3.0/0.41 |
| 3 | Airflex 405 pre-dried emulsion | Vinyl acetate-ethylene | 6.9/0.33 |
| 4 | Airflex 405 emulsion | Vinyl acetate-ethylene | 1.6/0.06 |

[1]Numbers represent an average of 3 measurements. The expansion ratio was determined as described under Test Methods, Expansion Ratio, Procedure 1.

Example 5

The composition shown in Table 9 can be extruded into various complex shapes, has good flexibility, i.e., can be wound on a tape case or hub, has good char strength, and retains good expansion after one week immersion in water.

TABLE 9

| Ingredient | Parts by Weight | Percent |
|---|---|---|
| Elvax 240 EVA | 100 | 25.4 |
| Irganox 1010 | 1 | 0.25 |
| Calcium stearate | 0.5 | 0.13 |
| Titan RKB4 | 10 | 2.53 |
| Hostaflam AP422 | 79 | 20.0 |
| Santicizer 141 | 4 | 1.01 |
| Expantrol ™4BW | 200 | 50.7 |

The formulation was mixed using a Schwabenthan Polymix 80 T, two-roll mill manufactured by Schwabenthan, Berlin, Germany. The roll temperatures were between 30 to 40° C. The compounded material was then pressed at 100° C. into an approximately 0.118 in (0.3 cm) sheet. Samples 0.98 in×0.98 in×0.12 in (2.5 cm×2.5 cm×0.3 cm) were cut from the sheet and the samples were charred at 350° C. for 10 minutes. A strong char was produced and the expansion ratio was 7.2.

The penetrometer and Shore A measurements of the composition were determined as described above under Test Methods. The average penetrometer measurement (softness) was 0.55 mm with a standard deviation of 0.08 mm and the average Shore A hardness was 93.6 with a standard deviation of 2.1.

The effect of one week immersion in water on the composition is shown in Table 10. There is only a slight loss of intumescence after water immersion. For this test, the samples removed from water were allowed to dry for 24 hours at room temperature before determining the char expansion.

TABLE 10

Water Immersion Test of the Composition Shown in Table 9

| Immersion Time in Days | Expansion Ratio[1] After Aging in Water at Room Temperature |
|---|---|
| 0 | 7.2 |
| 7 | 6.5 |

[1]Samples tested as described under Test Methods, Expansion Ratio, Procedure 2.

Example 6

Formulations Incorporating Graphite as an Additional Intumescent Agent

Formulations containing graphite in combination with Expantrol granules and Expantrol granules alone are listed in Table 11, below. Three grades of graphite, Kropfmuehl A15/90, Sigraflex FR 90-60/80 Type 2, and Lineta Expan-C-8099 Lte, were used. Overall, higher levels of intumescent result in greater expansion and somewhat greater oxygen index values. The addition of Kropfmuehl graphite particularly increased the expansion at the lower expansion temperature of 250° C.

TABLE 11

Expansion Ratio and Oxygen Index of Compositions Containing Graphite
In addition to ingredients listed in the table, all compositions contain 50 parts by weight Elvax 470 EVA, 50 parts by weight Natsyn 2200 isoprene rubber, and 2 parts by weight dicumyl peroxide.

| Ingredient Parts by Weight | A | B | C | D | E |
|---|---|---|---|---|---|
| Expantrol 4BW | 100 | 100 | 100 | 100 | 100 |
| Hostaflam AP422 | | 100 | 100 | 100 | 100 |
| Phos-Chek P30 | | | | 100 | |
| Graphite | 25[1] | 50[1] | | 50[2] | 50[3] |
| Composition | A | B | C | D | E |
| Expansion Ratio[4] at: | | | | | |
| 250° C. | 2.3 | 5.0 | 4.9 | 1.7 | 2.4 |
| 350° C. | 3.3 | 6.5 | 7.1 | 6.5 | 6.9 |
| 450° C. | 4.0 | 8.4 | 8.6 | 9.3 | 9.5 |
| Oxygen Index (%) | 41 | 48 | 49 | 49 | 54 |

[1]Kropfmuehl A15/90 graphite.
[2]Sigraflex FR 90-60/80 Type 2 graphite.
[3]Expan-C-8099 Lte graphite.
[4]Samples tested as described under Test Methods, Expansion Ratio, Procedure 2.

We claim:

1. A method of preparing a flexible solid intumescent fire barrier material, comprising the steps of:

(a) providing a halogen-free organic binder in the form of a latex binder;

(b) drying the latex binder to remove any volatiles;

(c) combining, in a substantially volatile free state, a mixture consisting essentially of the latex binder, water-insoluble intumescent mineral granules, and phosphorus containing flame retardant; and (d) mixing the mixture at high shear conditions using a twin screw extruder;

wherein the resulting fire barrier material has a softness value from about 0.49 to about 1.45 mm and an expansion ratio from about 6.9 to about 8.8.

* * * * *